United States Patent
Jeon

(10) Patent No.: US 10,903,472 B2
(45) Date of Patent: Jan. 26, 2021

(54) ELECTRODE TAB COUPLING MEMBER AND ELECTRODE TAB COUPLING ASSEMBLY COMPRISING SAME

(71) Applicant: LG Chem, Ltd., Seoul (KR)

(72) Inventor: Hyun Wook Jeon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 341 days.

(21) Appl. No.: 15/933,977

(22) Filed: Mar. 23, 2018

(65) Prior Publication Data

US 2018/0301685 A1    Oct. 18, 2018

(30) Foreign Application Priority Data

Apr. 12, 2017    (KR) .................. 10-2017-0047249

(51) Int. Cl.
*H01M 2/26* (2006.01)
*H01M 2/30* (2006.01)
*H01M 10/058* (2010.01)
*H01M 10/052* (2010.01)

(52) U.S. Cl.
CPC ............ *H01M 2/266* (2013.01); *H01M 2/30* (2013.01); *H01M 10/052* (2013.01); *H01M 10/058* (2013.01)

(58) Field of Classification Search
None
See application file for complete search history.

(56) References Cited

U.S. PATENT DOCUMENTS

2010/0167123 A1*   7/2010   Kim .................. H01M 10/0431
                                                  429/211

FOREIGN PATENT DOCUMENTS

| JP | 2011-210529 A |   | 10/2011 |
| JP | 2012142126 A | * | 7/2012 |
| KR | 2010-0131786 A |   | 12/2010 |
| KR | 2016-0004661 A |   | 1/2016 |

OTHER PUBLICATIONS

Machine translation of JP 2011-210529 A (Year: 2011).*
Machine translation of KR 10-2016-0004661 A (Year: 2016).*
Office Action dated Sep. 20, 2019, issued in corresponding Korean Patent Application No. 10-2017-0047249.

* cited by examiner

*Primary Examiner* — Robert S Carrico
(74) *Attorney, Agent, or Firm* — Morgan, Lewis & Bockius LLP

(57) ABSTRACT

The present disclosure provides an electrode tab coupling member and an electrode tab coupling assembly including the same that can solve the limitations of existing arts and the technical issues demanded from the past.

14 Claims, 4 Drawing Sheets

ELECTRODE TAB COUPLING MEMBER AND ELECTRODE TAB COUPLING ASSEMBLY COMPRISING SAME

CROSS-REFERENCE TO RELATED APPLICATION

This application claims priority to Korean Patent Application No. 10-2017-0047249 filed on Apr. 12, 2017 and all the benefits accruing therefrom under 35 U.S.C. § 119, the contents of which are incorporated by reference in their entirety.

BACKGROUND

The present disclosure relates to an electrode tab coupling member and an electrode tab coupling assembly including the same.

Secondary batteries, that can be charged and recharged, have attracted attention as power sources for apparatuses, which require high output and large capacity, including electric vehicles (EV), hybrid electric vehicles (HEV), plug-in hybrid electric vehicles (plug-in HEV) or the like which have been developed to solve problems, such as air pollution, caused by existing gasoline and diesel vehicles that use fossil fuels.

In such apparatuses, medium and large-sized battery modules, in which a plurality of battery cells are electrically connected, are used to provide high output and large capacity.

Since it is preferable to manufacture the medium and large-sized battery module as small and lightweight as possible, batteries of prismatic-type, pouch-type, or the like, which can be stacked with a high degree of integration and have relatively light weights compared to capacities thereof, are being mainly used as battery cells (unit cells) of the medium and large-sized battery module.

Recently, the pouch-type battery cell, having a structure in which a stack-type or stack/folding-type electrode assembly is built in a pouch-type battery case made of an aluminum laminate sheet, has attracted attention due to low manufacturing costs, a small weight, an easily changeable shape, and the like, and the use thereof is gradually increasing.

In such stack-type or stack/folding-type electrode assemblies, a plurality of electrode tabs (positive electrode tabs or negative electrode tabs) are required for electrically connecting positive electrode plates and negative electrode plates, which constitute the electrode assemblies, with an external device, and the plurality of electrode tabs pass through a process of being coupled to one electrode lead (a positive electrode or a negative electrode lead) by welding in order to facilitate the handling thereof.

Welding, the plurality of electrode tabs to one electrode lead as such has limitations in that welding defects may occur and it is difficult to secure the same quality between the welded portions.

In addition, in the process of welding the plurality of electrode tabs to one electrode, a welding device is inevitably required, and the device includes consumables, and thus, there is a problem in that production costs increase due to consumables replacement costs which periodically occur.

Thus, there is increasing demand for a technique which can ultimately improve the productivity of the battery modules and reduce the production costs of battery modules by simplifying the process of coupling the plurality of electrode tabs.

SUMMARY

The present disclosure provides an electrode tab coupling member and an electrode tab coupling assembly including the same that can solve the limitations of existing arts and the technical issues demanded from the past.

The inventors of the present application have repeatedly conducted in-depth research and experiments, and as described later, have found that when a member for coupling the electrode tabs of a battery cell is formed in a specific structure, the electrode tabs can be fixed even without welding the electrode tabs, and the battery cells can be electrically connected even without using a busbar for electrically connecting the battery cells in series or in parallel, thereby arriving at the completion of the present disclosure.

In accordance with an exemplary embodiment, an electrode tab coupling member for coupling electrode taps of a battery cell, in which an electrode assembly including a positive electrode, a separator, and a negative electrode is built in a battery case, and the electrode assembly is formed in a structure in which the electrode tabs each outwardly protrude from the battery case, and a plurality of electrode plates are stacked between the positive electrode and the negative electrode with the separator interposed therebetween, the electrode tab coupling member including: a first plate facing first surfaces of the electrode tabs; a second plate facing second surfaces, opposite to the first surfaces, of the electrode tabs; and a pressing member configured to press a slit between the first plate and the second plate, wherein the electrode tabs are positioned between the first plate and the second plate, and when the pressing member presses the first plate and the second plate, the electrode tabs are fixedly coupled to each other.

The first plate may include a protrusion part protruding toward the second plate, the second plate may include a recess part accommodating the protrusion part of the first plate, and when pressed by the pressing member, the electrode tabs may be pressed and fixed between the protrusion part and the recess part.

Accordingly, a process of welding the electrode tabs may not be provided, so that a problem such as thermal damage due to heat of the electrode tabs generated in a welding process can be prevented, and a quality management problem caused by uneven welding may be prevented.

Both the protrusion part and the recess part may have semispherical cross-sectional shapes and extend in a direction perpendicular to a protruding direction of the electrode tabs when viewed in a plane.

As such, the protrusion part and the recess part, which press the electrode tabs while being in close contact therewith, are formed to have semispherical cross-sections, the problem of damage of the electrode taps which may be caused in a process of pressing and fixing the electrode taps may be prevented in advance.

The first plate may have a pair of first protrusion parts spaced apart a predetermined distance from each other and protruding toward the second plate, the second plate may have a second protrusion part protruding toward the first plate, and when pressed by the pressing member, the second protrusion part may be accommodated between the pair of first protrusion parts such that the electrode tabs may be pressed and fixed between the first protrusion part and the second protrusion part.

The first protrusion part and the second protrusion part may have semispherical cross-sectional shapes and extend in a direction perpendicular to a protruding direction of the electrode tabs when viewed in a plane.

As such, the pair of first protrusion part is disposed on the same plane of a surface of the first plate so as to be spaced a predetermined distance from each other, so that contact areas against the electrode tabs may be increased, the pressing strength between the first plate and the second plate may thereby be increased, and thus, the fixing force of the electrode tabs may be increased.

The electrode tabs may have recesses and protrusions which have semispherical cross-sections corresponding to the first and second protrusion parts so as to be in close contact with the first and second protrusion parts.

Meanwhile, the first and second protrusion parts may be formed in a shape other than the semispherical shape according to a selection of a designer, and accordingly, recesses and protrusions formed on the electrode tabs are formed to correspond to the shapes of the first and second protrusion parts, and thus, the first and second protrusion parts may be brought into closer contact with the electrode tabs.

The pressing member may be a bolt, and according to rotation of the bolt, the distance between the first plate and the second plate may be decreased whereby the electrode tabs may be pressed and fixed.

Meanwhile, the pressing member is not limited to bolts, and any member, which may decrease the distance between the first and second plates and thereby fix the electrode tabs, may be used.

In addition, the present disclosure provides a battery module including the above-mentioned electrode tab coupling member.

In accordance with yet another exemplary embodiment, an electrode tab coupling assembly configured to electrically connect electrode taps of n number of battery cells wherein an electrode assembly including a positive electrode, a separator, and a negative electrode is built in a battery case, and the electrode assembly is formed in a structure in which the electrode tabs each outwardly protrude from the battery case, and a plurality of electrode plates are stacked between the positive electrode and the negative electrode with the separator interposed therebetween, wherein the electrode tab coupling assembly is formed of a conductive material, whereby when the electrode tabs of the n number of battery cells are pressed and fixed by the slit pressing members while being respectively inserted into the positive electrode and negative electrode accommodating slits, the n number of battery cells are electrically connected.

At this point, the sizes of the slits are provided so as to form spaces which may sufficiently accommodate the positive electrode tabs and the negative electrode tabs which are provided in one battery cell.

Protrusion parts and recess parts may be respectively formed in directions facing each other inside the n number of positive electrode and negative electrode accommodating slits, the protrusion parts and recess parts may be formed in shapes corresponding to each other, and when pressed by the slit pressing member, the electrode tabs may be pressed and fixed between the protrusion parts and the recess parts.

In addition, the protrusion part and the recess parts may be formed of a conductive material and may thus fix the positive electrode tabs and the negative electrode tabs, which are formed in one battery cell, and electrically connect the battery cells in series or in parallel.

Both the protrusion part and the recess part may have semispherical cross-sectional shapes and extend in a direction perpendicular to a protruding direction of the electrode tabs when viewed in a plane.

In each of the n number of positive electrode and negative electrode accommodating slits, a pair of first protrusion parts which are disposed on the same plane and spaced a predetermined distance from each other and a second protrusion part provided in a direction facing the first protrusion parts may be provided, and when pressed by the pressing member, the second protrusion part may be accommodated between the pair of first protrusion parts, and thus, the electrode tabs may be pressed and fixed between the first protrusion parts and the second protrusion part.

Both the first protrusion part and the second protrusion part may have semispherical cross-sectional shapes and extend in a direction perpendicular to a protruding direction of the electrode tabs when viewed in a plane.

In addition, the present disclosure provides a battery pack including the above-mentioned electrode tab coupling assembly.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Hereinafter the present disclosure will be described in detail with reference to the accompanying drawings in accordance with exemplary embodiments, but the scope of the present disclosure should not be construed as limited to the embodiments.

Figure 1:
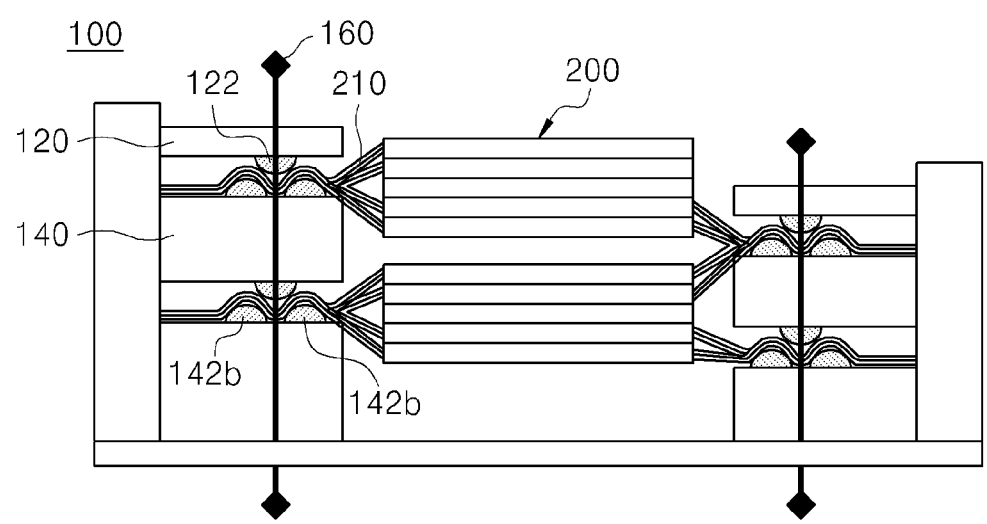
FIG. 1 is a schematic view illustrating a structure in which electrode tabs formed in a battery cell are fixed between a first plate and a second plate through an electrode tab connecting member in accordance with an exemplary embodiment.

FIG. 1 is a schematic view illustrating a structure in which electrode tabs formed in a battery cell are fixed between a first plate and a second plate through an electrode tab connecting member in accordance with an exemplary embodiment.

For reference, while an electrode tab connecting assembly is schematically illustrated in FIG. 1, the electrode tab connecting assembly includes an electrode tab connecting member in accordance with an exemplary embodiment, and in order to describe the electrode tab connecting member, only a portion of the electrode tab connecting assembly will be described.

Referring to FIG. 1, an electrode tab connecting member 100 includes a first plate 140, a second plate 120 and a pressing member 160

At this point, electrode taps 210 outwardly protrude from one side of a battery cell 200 and extend by a distance such that the electrode tabs 210 can be inserted between the first plate 140 and the second plate 120 and fixed thereto.

The first plate 140 is formed to face first surfaces of the electrode tabs 210, and the second plate 120 is formed to face second surfaces opposite to the first surfaces of the electrode tabs 210.

In addition, the pressing member 160 is formed such that the spaced distance between the first plate 140 and the second plate 120 can be adjusted, and that the electrode tabs 210 are fixed between the first plate 140 and the second plate 120 by adjusting the pressing member 160.

At this point, a pair of first protrusion parts 142a and 142b which are spaced apart a predetermined distance from each other and protrude toward the second plate 120 are formed on in the first plate 140, and a second protrusion part 122 protruding toward the first plate 140 is formed on the second plate 120.

Accordingly, when pressed by the pressing member 160, the second protrusion part 122 is received between the pair of first protrusion parts 142a and 142b, and thus, the electrode tabs 210 are pressed and fixed between the pair of first protrusion parts 142a and 142b and the second protrusion part 122.

In addition, first protrusion parts 142a and 142b and the second protrusion part 122 have semi-spherical cross-sectional shapes and extend in a direction perpendicular to the protruding direction of the electrode tabs 210 when viewed in a plane.

Figure 2:
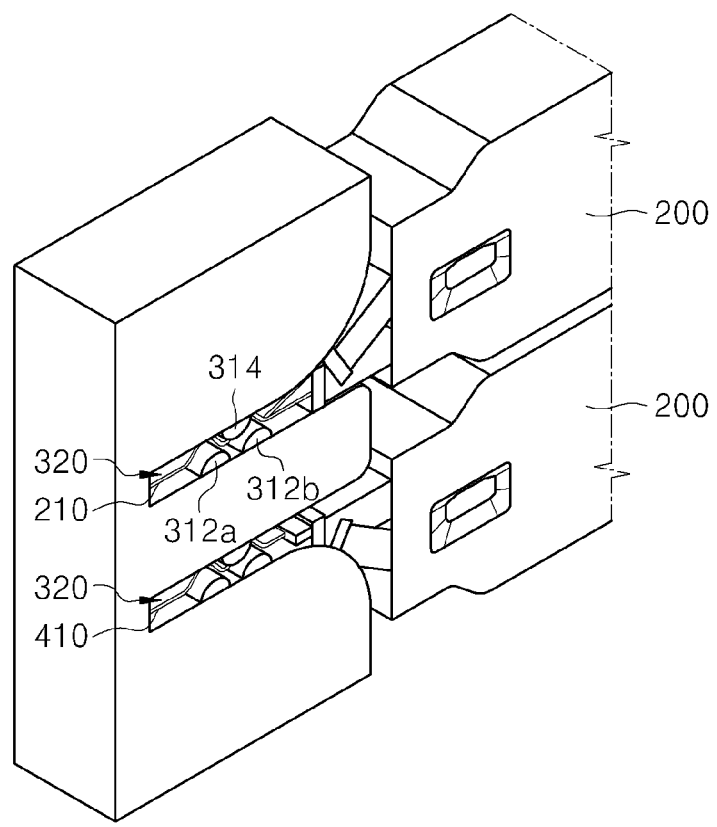
FIG. 2 is a perspective view illustrating a structure in which the electrode tabs, respectively formed in a plurality of battery cells are fixed through an electrode tab connecting assembly in accordance with an exemplary embodiment.
Figure 3:
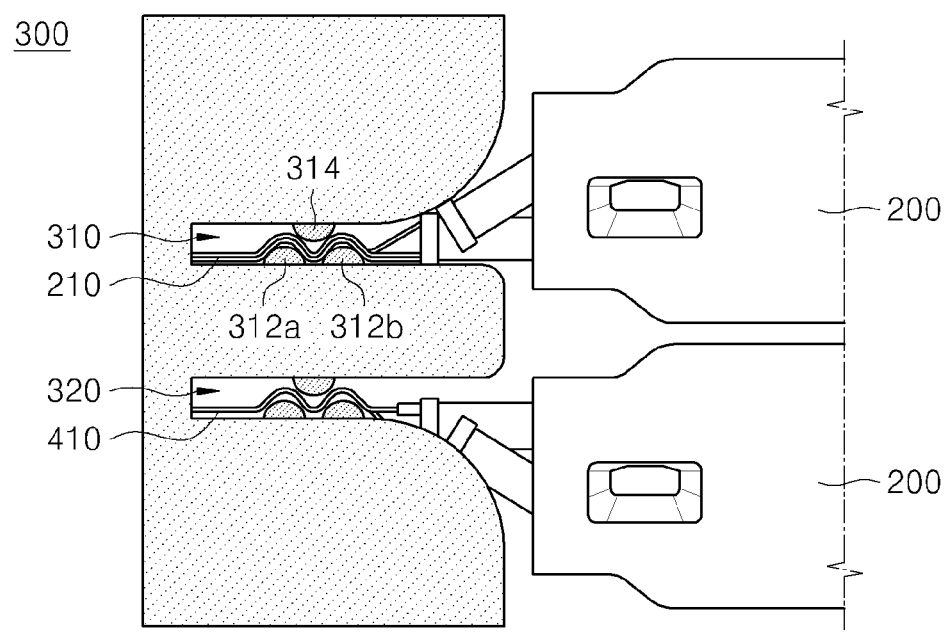
FIG. 3 is a perspective view illustrating a structure in which the electrode tabs, respectively formed in a plurality of battery cells are fixed through an electrode tab connecting assembly in accordance with an exemplary embodiment.
Figure 4:
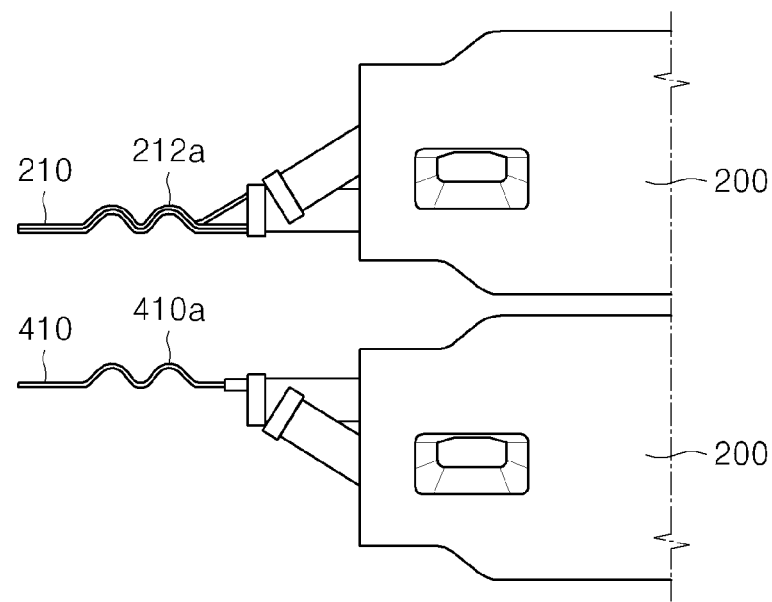
FIG. 4 is a schematic view illustrating a structure in which recesses and protrusions are formed on electrode tabs respectively formed in a plurality of battery cells.

FIG. 2 is a perspective view illustrating a structure in which the electrode tabs, respectively formed in a plurality of battery cells are fixed through an electrode tab connecting assembly in accordance with an exemplary embodiment, and FIG. 3 is a perspective view illustrating a structure in which the electrode tabs, respectively formed in a plurality of battery cells are fixed through an electrode tab connecting assembly in accordance with an exemplary embodiment.

Referring to FIGS. 2 and 3, a first battery cell 200 and a second battery cell 400 are stacked, and electrode tabs 210 and 410 outwardly protrude respectively from the first battery cell 200 and the second battery cell 400.

At this point, in an electrode tab connecting assembly 300, electrode accommodating slits 310 and 320 for respectively accommodating the electrode tabs 210 and 410 are provided by the number of the stacked battery cells, and slit pressing members (not shown) are provided to press spaces of the electrode accommodating slits 310 and 320.

In addition, the electrode tab connecting assembly 300 is formed of a conductive member, so that when the electrode tabs 210 and 410 are pressed and fixed by the slit pressing members while being respectively inserted into the electrode accommodating slits 310 and 320, the first and second battery cells 200 and 400 are electrically connected.

At this point: inside the electrode accommodating slits 310 and 320, a pair of first protruding parts 312a and 312b, which are disposed on the same plane and spaced apart a predetermined distance from each other, and a second protruding part 314, which is formed to face the pair of first protruding parts 312a and 312b, are provided; and when pressed by the slit pressing members, the second protruding part 314 is accommodated between the pair of first protruding parts 312a and 312b, and thus, the electrode tabs 210 and 410 are pressed and fixed between the pair of first protruding parts 312a and 312b and the second protruding part 314.

In addition, the first protrusion parts 312a and 312b and the second protrusion part 314 have semi-spherical cross-sectional shapes and extend in a direction perpendicular to the protruding direction of the electrode tabs 210 and 410 when viewed in a plane.

At this point, the electrode tabs 210 and 410 have recesses and protrusions, which have cross-sectional shapes corresponding to the shapes of the first protrusion parts 312a and 312b and the second protrusion part 314, so as to be in close contact with first protrusion parts 312a and 312b and the second protrusion part 314.

As described above, an electrode tab coupling member in accordance with an exemplary embodiment exhibits an effect in that a protrusion part is formed on a first plate and a recess part for accommodating the protrusion part of the first plate is formed in a second plate, and thus, electrode tabs provided in a battery cell can be fixed without a welding process.

In addition, an electrode tab coupling assembly in accordance with an exemplary embodiment includes: n number of positive electrode accommodating slits which respectively accommodate the positive electrode tabs of n number of battery cells; and n number of negative electrode accommodating slits which respectively accommodate the negative electrode tabs of n number of battery cells, and exhibits an effect in that the positive electrode tabs and the negative electrode tabs are respectively pressed and fixed in the positive electrode accommodating slits and the negative electrode accommodating slits and electrically connected, and thus, the battery cells can be electrically connected in series or in parallel without a busbar.

Those with ordinary skill in the art could make various modifications and changes on the basis of the above-mentioned description without departing from the spirit and scope of the present invention.

What is claimed is:

1. An electrode tab coupling member for coupling electrode tabs of a battery cell in which an electrode assembly comprising a positive electrode, a separator, and a negative electrode is built in a battery case, and the electrode assembly is formed in a structure in which the electrode tabs each outwardly protrude from the battery case, and a plurality of electrode plates are stacked between the positive electrode and the negative electrode with the separator interposed therebetween, the electrode tab coupling member comprising:
    a first plate facing first surfaces of the electrode tabs;
    a second plate facing second surfaces, opposite to the first surfaces, of the electrode tabs; and
    a bolt configured to press a slit between the first plate and the second plate,
    wherein the electrode tabs are positioned between the first plate and the second plate, and when the bolt presses the first plate and the second plate, the electrode tabs are fixedly coupled to each other,
    wherein:
        the first plate comprises a protrusion part protruding toward the second plate,
        the second plate comprises a recess part accommodating the protrusion part of the first plate, and
        both the protrusion part and the recess part extend in a direction perpendicular to a protruding direction of the electrode tabs when viewed in a plane.

2. The electrode tab coupling member of claim 1, wherein when pressed by the bolt, the electrode tabs are pressed and fixed between the protrusion part and the recess part.

3. The electrode tab coupling member of claim 2, wherein both the protrusion part and the recess part have semispherical cross-sectional shapes when viewed in the plane.

4. The electrode tab coupling member of claim 1, wherein according to rotation of the bolt, the distance between the first plate and the second plate is decreased whereby the electrode tabs are pressed and fixed.

5. A battery module comprising the electrode tab coupling member of claim 1.

6. An electrode tab coupling member for coupling electrode tabs of a battery cell in which an electrode assembly comprising a positive electrode, a separator, and a negative electrode is built in a battery case, and the electrode assembly is formed in a structure in which the electrode tabs each outwardly protrude from the battery case, and a plurality of electrode plates are stacked between the positive electrode and the negative electrode with the separator interposed therebetween, the electrode tab coupling member comprising:
   a first plate facing first surfaces of the electrode tabs;
   a second plate facing second surfaces, opposite to the first surfaces, of the electrode tabs; and
   a bolt configured to press a slit between the first plate and the second plate,
   wherein the electrode tabs are positioned between the first plate and the second plate, and when the bolt presses the first plate and the second plate, the electrode tabs are fixedly coupled to each other,
   wherein the first plate comprises a pair of first protrusion parts spaced apart by a flat surface at a predetermined distance from each other and protruding toward the second plate,
   wherein the second plate comprises a second protrusion part protruding toward the first plate,
   wherein both the first protrusion parts and the second protrusion part extend in a direction perpendicular to a protruding direction of the electrode tabs when viewed in a plane, and
   when pressed by the bolt, the second protrusion part is accommodated between the pair of first protrusion parts such that the electrode tabs are pressed and fixed between the first protrusion part and the second protrusion part.

7. The electrode tab coupling member of claim 6, wherein the first protrusion parts and the second protrusion part have semispherical cross-sectional shapes.

8. The electrode tab coupling member of claim 7, wherein the electrode tabs comprise recesses and protrusions which have semispherical cross-sections corresponding to the first and second protrusion parts so as to be in close contact with the first and second protrusion parts.

9. An electrode tab coupling assembly configured to electrically connect electrode tabs of n number of battery cells wherein an electrode assembly comprising a positive electrode, a separator, and a negative electrode is built in a battery case, and the electrode assembly is formed in a structure in which the electrode tabs each outwardly protrude from the battery case and a plurality of electrode plates are stacked between the positive electrode and the negative electrode with the separator interposed therebetween, the electrode tab coupling assembly comprising:
   n number of positive electrode accommodating slits configured to respectively accommodate positive electrode tabs of the n number of battery cells;
   n number of negative electrode accommodating slits configured to respectively accommodate negative electrode tabs of the n number of battery cells; and
   bolts configured to press the spaces of the n number of positive electrode accommodating slits and the n number of negative electrode accommodating slits,
   wherein the electrode tab coupling assembly is formed of a conductive material, whereby when the electrode tabs of the n number of battery cells are pressed and fixed by the bolts while being respectively inserted into the positive electrode accommodating slits and negative electrode accommodating slits, the n number of battery cells are electrically connected,
   wherein protrusion parts and recess parts are respectively formed in directions facing each other inside the n number of positive electrode accommodating slits and negative electrode accommodating slits, and
   wherein both the protrusion part and the recess part extend in a direction perpendicular to a protruding direction of the electrode tabs when viewed in a plane.

10. The electrode tab coupling assembly of claim 9, wherein
   the protrusion parts and recess parts are formed in shapes corresponding to each other, and
   when pressed by the bolts, the electrode tabs are pressed and fixed between the protrusion parts and the recess parts.

11. The electrode tab coupling assembly of claim 10, wherein both the protrusion part and the recess part have semispherical cross-sectional shapes.

12. A battery pack comprising the electrode tab coupling assembly of claim 9.

13. An electrode tab coupling assembly configured to electrically connect electrode tabs of n number of battery cells wherein an electrode assembly comprising a positive electrode, a separator, and a negative electrode is built in a battery case, and the electrode assembly is formed in a structure in which the electrode tabs each outwardly protrude from the battery case and a plurality of electrode plates are stacked between the positive electrode and the negative electrode with the separator interposed therebetween, the electrode tab coupling assembly comprising:
   n number of positive electrode accommodating slits configured to respectively accommodate positive electrode tabs of the n number of battery cells;
   n number of negative electrode accommodating slits configured to respectively accommodate negative electrode tabs of the n number of battery cells; and
   bolts configured to press the spaces of the n number of positive electrode accommodating slits and the n number of negative electrode accommodating slits,
   wherein the electrode tab coupling assembly is formed of a conductive material, whereby when the electrode tabs of the n number of battery cells are pressed and fixed by the bolts while being respectively inserted into the positive electrode accommodating slits and negative electrode accommodating slits, the n number of battery cells are electrically connected,
   wherein in each of the n number of positive electrode accommodating slits and negative electrode accommodating slits, a pair of first protrusion parts, which are disposed on the same plane and spaced apart by a flat surface at a predetermined distance from each other, and a second protrusion part provided in a direction facing the pair of first protrusion parts are provided, and
   when pressed by the bolts, the second protrusion part is accommodated between the pair of first protrusion parts, and thus, the electrode tabs are pressed and fixed between the pair of first protrusion parts and the second protrusion part,
   wherein both the first protrusion parts and the second protrusion part extend in a direction perpendicular to a protruding direction of the electrode tabs when viewed in a plane.

14. The electrode tab coupling assembly of claim 13, wherein each of the pair of the first protrusion parts and the second protrusion part have semispherical cross-sectional shapes.

\* \* \* \* \*